Jan. 9, 1940.  S. A. SNELL  2,186,560
JUVENILE VEHICLE BODY
Original Filed July 31, 1937
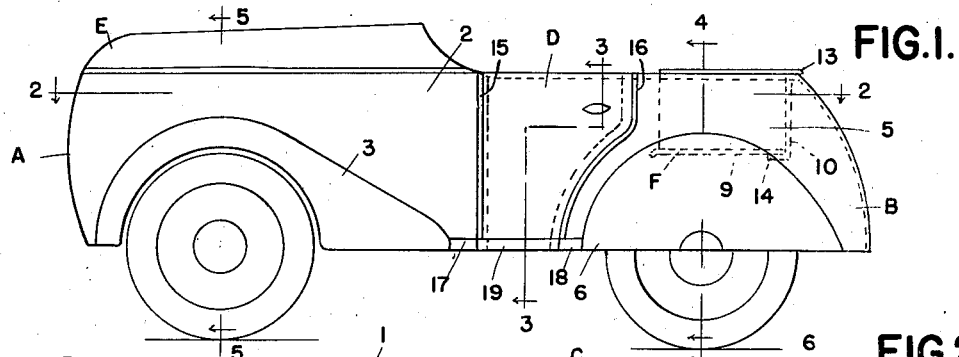
FIG.1.
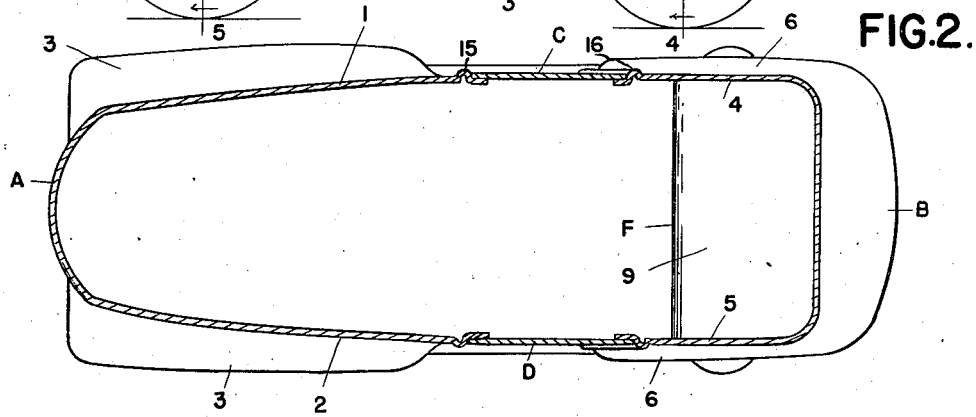
FIG.2.
FIG.5.   FIG.3.   FIG.4.
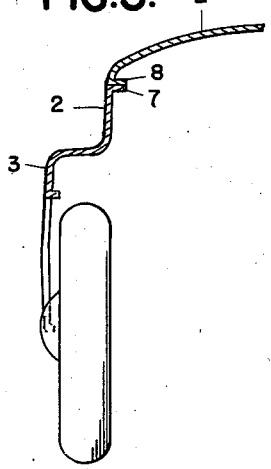 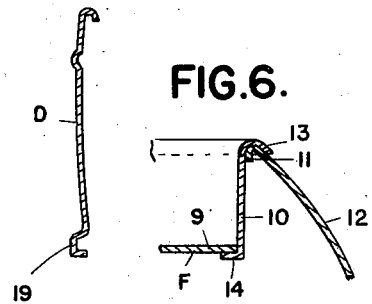 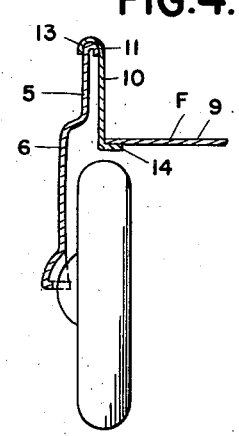
FIG.6.
*INVENTOR*
SAMUEL A. SNELL
BY
*ATTORNEYS*

Patented Jan. 9, 1940

2,186,560

UNITED STATES PATENT OFFICE 2,186,560

JUVENILE VEHICLE BODY

Samuel A. Snell, Toledo, Ohio, assignor to The American-National Company, Toledo, Ohio, a corporation of Ohio Original application July 31, 1937, Serial No. 156,789, which is a division of application Serial No. 131,101, March 15, 1937, now Patent No. 2,145,896, dated February 7, 1939. Divided and this application February 21, 1938, Serial No. 191,748

7 Claims. (Cl. 280—87.01)

This invention relates generally to juvenile vehicle bodies of the type in which a child rides, and constitutes a division of my application filed July 31, 1937, bearing Serial No. 156,789 which is a division of my application filed March 15, 1937, bearing Serial No. 131,101, now Patent 2,145,896 dated Feb. 7, 1939.

One of the essential objects of the invention is to provide a vehicle body of this type which is built up of relatively light weight sheet metal stampings and that is constructed in such a way that it will effectively withstand the stresses and strains to which it is subjected while in use.

Another object is to produce from a minimum number of dies vehicle bodies of various lengths, and for this purpose to have stampings for the front and rear ends of the body that can be uniformly used regardless of the length desired.

Another object is to provide a body of the type mentioned wherein the over-all number of stampings required to accomplish the results desired is reduced to a minimum.

Other objects, advantages and novel details of construction of this invention will be made more apparent as this description proceeds, especially when considered in connection with the accompanying drawing, wherein:

Figure 1 is a side elevation of a juvenile vehicle body embodying my invention;

Figure 2 is a sectional view taken substantially on the line 2—2 of Figure 1;

Figure 3 is a sectional view taken substantially on the line 3—3 of Figure 1;

Figure 4 is a sectional view taken substantially on the line 4—4 of Figure 1;

Figure 5 is a sectional view taken substantially on the line 5—5 of Figure 1;

Figure 6 is a vertical longitudinal section through the seat and rear deck.

Referring now to the drawing, A is the front section, B is the rear section, and C and D, respectively, are the intermediate sections of a juvenile vehicle body embodying my invention.

As shown, the front section A is substantially U-shaped in plan and forms the front end of the body. The rear section B is likewise substantially U-shape in plan and forms the rear end of the body. The intermediate sections C and D each simulate doors and are rigidly secured, preferably by welding, in overlapping relation to the contiguous end portions of said front and rear sections A and B.

Preferably opposite sides 1 and 2, respectively, of the front section A have outwardly bulging portions 3 forming fenders for the front wheels of the vehicle. Likewise, opposite sides 4 and 5, respectively, of the rear section B have outwardly bulging portions 6 forming fenders for the rear wheels of the vehicle. At the upper edges of the sides 1 and 2 of the front section A are inturned flanges 7 to which similar flanges 8 of a suitable hood E are secured.

At the rear end of the body is a seat F formed of stampings 9 and 10 which are supported from inturned flanges 11 at the upper edges of the side and rear portions 4, 5 and 12, respectively, of the rear section B. Preferably the seat stamping 9 extends substantially horizontal between and is free of the side portions 4 and 5 of the rear section, while the upright stampings 10 of the seat have flanges 13 overlying and secured to the inturned flanges 11 and have flanges 14 underlying and secured to the seat stamping 9.

To provide a pleasing appearance and to insure a strong and durable construction, the side portions 1, 2, 4 and 5, respectively, of the front and rear sections A and B are provided adjacent their opposed edges with outwardly embossed strip-like portions 15 and 16, respectively, that form frame-like abutments for the contiguous edges of the intermediate sections C and D.

To further stiffen and reinforce the structure, the side portions 1 and 2 of the front section are provided at their lower edges in rear of the fenders 3 with inwardly opening channels 17, the side portions 4 and 5 of the rear section B are provided at their lower edges in advance of the fenders 6 with inwardly opening channels 18, and the intermediate sections C and D are provided at their lower edges with inwardly opening channels 19. As shown, the ends of the channels 19 of the intermediate sections are secured in overlapping relation to the adjacent ends of the channels 17 and 18 and cooperate with each other to provide a strong and durable structure.

In the process of construction the front and rear sections A and B are formed separately from sheet metal and are spaced apart the proper distance to receive therebetween the intermediate sections C and D. These intermediate sections C and D are also formed separately from sheet metal and are welded to the side portions 1, 2, 4 and 5, respectively, of the front and rear sections to form an elongated shell. The hood E and the seat stampings 9 and 10 are then welded to the shell as shown to complete the body structure. Thus, all of the parts of the vehicle body are formed of sheet metal and are permanently and rigidly united. The size of the intermediate sections C and D determines the length of the juvenile vehicle body when completed. Thus, by spacing the front and rear sections A and B farther or closer apart and by using intermediate sections C and D of correspondingly different sizes, it is possible to provide juvenile vehicle bodies of different length.

What I claim as my invention is:

1. In a juvenile vehicle body of the type in which a child rides, a stamping substantially U-shape in plan forming the front end of the body, a second stamping substantially U-shaped in plan forming the rear end of the body, and substantially flat stampings simulating doors overlapping and rigid with the adjacent sides of said front and rear end stampings, the sides of said front and rear end stampings being provided at their adjacent edges with offset strip-like embossed portions forming frame-like abutments for the contiguous edges of the flat stampings.

2. A juvenile vehicle body of the type in which a child rides having longitudinally spaced substantially U-shaped sections forming the front and rear ends of the body, and intermediate sections simulating doors overlapping and rigidly secured to adjacent side portions of said end sections, the lower side edges of said spaced sections being channel-shaped, and the lower edges of said intermediate sections being channel-shaped and overlapping and rigidly secured to the channel-shaped portions of said spaced sections.

3. A juvenile vehicle body of the type in which a child rides comprising an elongated shell, a cowl, and a seat, the shell having rounded forward and rear end walls and substantially parallel side walls and comprising two substantially U-shaped formations of sheet metal and intermediate side panel sections, said U-shaped formations being spaced apart in opposed relation and opening toward one another, one of said U-shaped formations constituting the forward end and adjacent portions of said side walls, the other of said U-shaped formations constituting the rear end and adjacent portions of said side walls, the side panel sections being intermediate and rigidly secured to adjacent edges of the portions aforesaid of said side walls, the cowl being substantially inverted trough-shaped configuration and having its edges rigidly secured to the upper edges of the foremost U-shaped formation, and the seat being embraced by and rigidly suspended from the upper edges of the rearmost U-shaped formation.

4. A juvenile vehicle body of the type in which a child rides comprising an elongated shell, and a seat, the shell having rounded forward and rear end walls and substantially parallel side walls and comprising two substantially U-shaped formations of sheet metal and intermediate side panel sections, said U-shaped formations being spaced apart in opposed relation and opening toward one another, one of said U-shaped formations constituting the forward end and adjacent portions of said side walls, the other of said U-shaped formations constituting the rear end and adjacent portions of said side walls, the side panel sections being intermediate and rigidly secured to adjacent edges of the portions aforesaid of said side walls, and the seat being embraced by and rigidly secured to the rearmost U-shaped formation.

5. A juvenile vehicle body of the type in which a child rides comprising an elongated shell, and a cowl, the shell having rounded forward and rear end walls and substantially parallel side walls and comprising two substantially U-shaped formations of sheet metal and intermediate side panel sections, said U-shaped formations being spaced apart in opposed relation and opening toward one another, one of said U-shaped formations constituting the forward end and adjacent portions of said side walls, the other of said U-shaped formations constituting the rear end and adjacent portions of said side walls, the side panel sections being intermediate and rigidly secured to adjacent edges of the portions aforesaid of said side walls, the cowl being substantially inverted trough-shaped configuration and having its edges rigidly secured to the upper edges of the foremost U-shaped formation.

6. A juvenile vehicle body of the type in which a child rides having a rigid load carrying elongated shell provided with rounded upright forward and rear end walls and substantially parallel upright side walls, said shell comprising two substantially U-shaped formations of sheet metal and intermediate side panel sections, said U-shaped formations being spaced apart in opposed relation and opening toward one another, one of said U-shaped formations constituting the forward end and adjacent portions of said side walls, the other of said U-shaped formations constituting the rear end and adjacent portions of said side walls, and the side panel sections being intermediate and rigidly secured to adjacent edges of the portions aforesaid of said side walls, said side panel sections and the side wall portions of said U-shaped formations forming elongated trusses.

7. A juvenile vehicle body having a rigid elongated hollow shell provided with upright forward and rear end walls and substantially parallel upright side walls, comprising four stampings, two of said stampings being substantially U-shape in plan, and the other two of said stampings being substantially flat side panel sections, the U-shaped stampings being spaced apart in opposed relation and opening toward each other, one of said U-shaped stampings forming the forward end and adjacent portions of the side walls of the shell, the other of said U-shaped stampings forming the rear end and adjacent portions of the side walls of the shell, and said side panel stampings being intermediate and rigidly secured to adjacent edges of the side wall portions of said U-shaped stampings whereby said side panel sections cooperate with the side wall portions of said U-shaped stampings to form elongated trusses.

SAMUEL A. SNELL.